INVENTOR.
DAVID S. STACEY
BY
Campbell, Harris & O'Rourke
ATTORNEYS

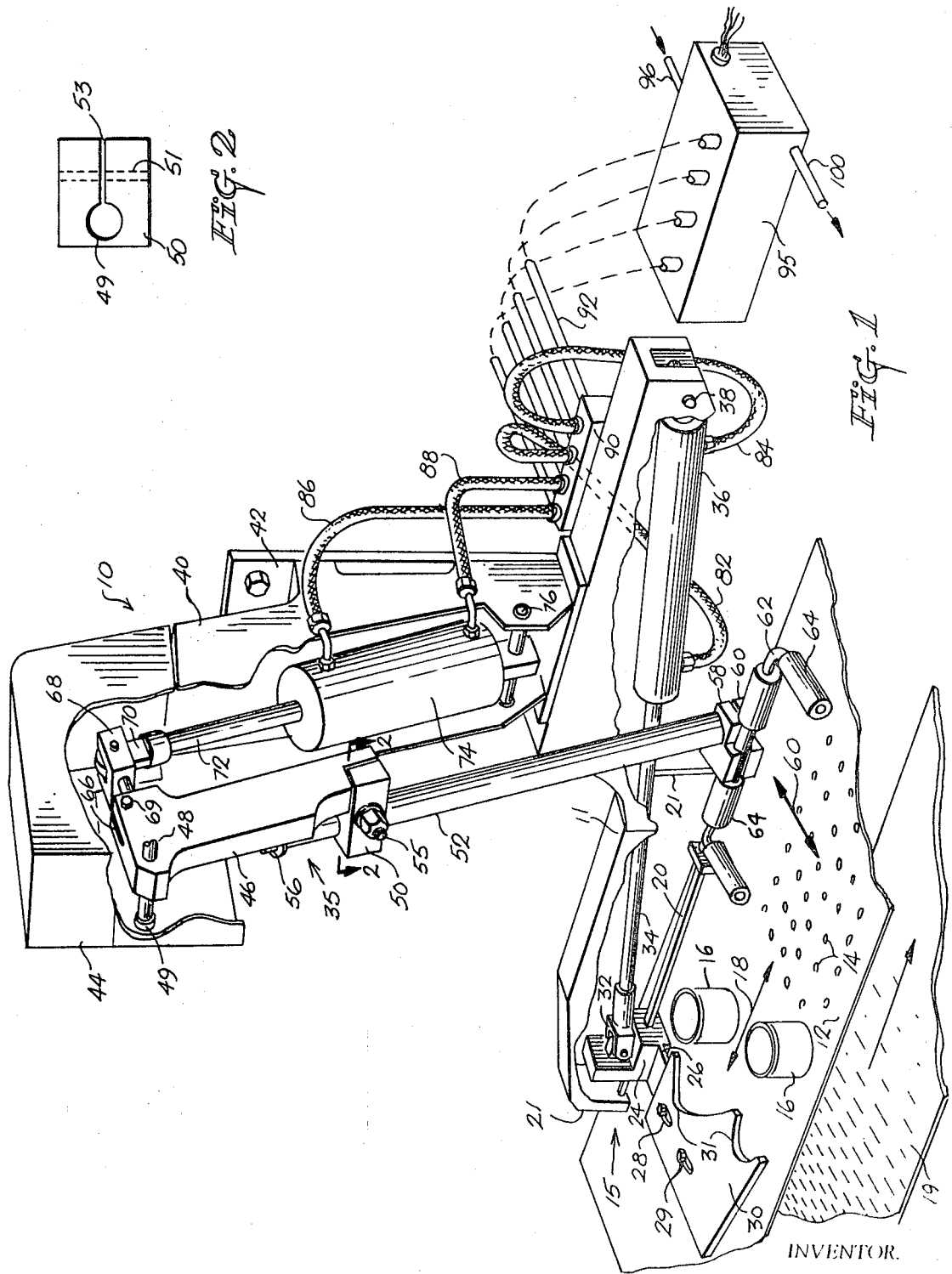

United States Patent Office 3,583,862
Patented June 8, 1971

3,583,862
TIMEABLE GLASSWARE TRANSFER APPARATUS
David S. Stacey, Carbondale, Colo., assignor to
Ball Corporation, Muncie, Ind.
Filed Dec. 19, 1968, Ser. No. 785,153
Int. Cl. C03b 27/00
U.S. Cl. 65—181           7 Claims

ABSTRACT OF THE DISCLOSURE

Apparatus for transferring glass containers from the cooling deadplate, upon which the hot glassware is positioned after formation, to an adjacent moving conveyor. A push-across assembly first slides the glassware in a direction along the conveyor to a position adjacent a push-out assembly which sequentially slides the glassware onto the conveyor belt for subsequent transfer through an annealing oven. The push-across and push-out assemblies may be fluid driven and operate in an adjustably timeable sequence in response to electrical timing signals activating solenoid control valves.

BACKGROUND OF THE INVENTION

Field of the invention

This invention relates generally to an article transfer apparatus and more particularly to a timeable apparatus for transferring hot glassware from a deadplate to an adjacent and moving conveyor belt.

Description of the prior art

In mass manufacture of glass jars and similar glass articles, a plurality of sections of a glassware forming machine commonly utilize a suitable conveyor for transfer of the newly formed ware from the machine and ultimately to an annealing oven, or lehr. Since newly formed articles, when taken from the forming section, have not cooled sufficiently from the molten glass state so that the article is appreciably hardened, the ware is transferred by tongs, or the like, from the forming mold to a deadplate where the article is allowed to cool for a time before being moved onto the conveyor belt. Commonly, the deadplate has perforations through which air may be blown to reduce the ware temperature. When cooled sufficiently, the ware is transferred to the conveyor belt from each forming section and thus the transferring device must be capable of delivering the ware to the conveyor at a precise time relative to ware delivered from the other sections. Further, if the transferring device includes a push-out mechanism, as is common, the ware-engaging portions of the apparatus must move in a smooth, even stroke so as not to damage or topple the ware either on the deadplate or on the continuously moving conveyor.

Heretofore, the glass jars and bottles were commonly moved from the deadplate to the conveyor belt by a pivotable linkage arrangement mounted above and alongside the deadplate, the arrangement including a cam roller, cam, and variable speed cam shaft at the drive end. In order to conserve space and to avoid utilization of heavy cams, the moment arms between the cam and pivot were very small compared with the long moment arms between the pivot and ware engagement portions which move a relatively large distance compared to the movement of the cam follower. As a result, the cam shafts were excessively loaded thereby necessitating constant lubrication and linkage adjustments to avoid erratic and "jerky" movements. However, even with constant lubrication, failures were still frequent and often resulted in lost production of at least a forming section until adequate repairs could be completed and the section then again placed in operation.

In addition, prior systems have not proved to be completely successful due, at least in part, to the lack of a provision for remote adjustment of the push-out mechanism.

SUMMARY OF THE INVENTION

The present invention overcomes the heretofore existing disadvantages found in push-out mechanisms and thus provides an improved fluid-driven transfer system to move glassware from the deadplate to the moving conveyor.

The apparatus is stationed adjacent to the deadplate and includes a push-across assembly to slide the glassware from its initial position on the cooling deadplate to a position adjacent a push-out assembly which in turn slides the ware onto the conveyor belt. The assemblies are fluid driven and controlled through solenoid-actuated valves which are responsive to signals from an electrical timing control circuit.

In view of the foregoing, it is an object of the invention to provide an improved transfer device for moving glassware from a deadplate to a moving conveyor belt.

It is a further object of the invention to provide a timeable, fluid-driven transfer apparatus for moving newly formed glass articles such as jars, bottles, and the like, from a cooling deadplate to an adjacent moving conveyor belt.

It is another object of the invention to provide apparatus to transfer one or a plurality of articles of glassware in two directions on a plate by sliding the glassware with a smooth, even stroke so as to prevent toppling or damaging the glassware.

A further object of the invention is to slide newly formed glassware and similar articles from a stationary deadplate to a moving conveyor without interfering with the means initially transferring the ware from the glass forming machine to the deadplate.

A further object of the present invention is to provide a fluid drive system in the push-across and push-out assemblies.

A further object of the invention is to provide glass container transfer apparatus including a push-across assembly and a push-out assembly which apparatus may be readily adjusted to control the stroke length and sequence of the assemblies.

Another object of the invention is to provide a timing means to synchronize the transfer with other similar type apparatus positioned along the conveyor in order to effect uniform spacing of the glassware on the conveyor.

Another object of the invention is to provide a timing means to control the operational sequence of the push-across and push-out assemblies.

It is a further object of the invention to provide a timing means to control the operational sequence of the push-out assembly relative to push-out assemblies of other and like apparatus utilizing a common conveyor in a glass container manufacturing facility.

Additional objects of the invention will become apparent from the following description which is given primarily for purposes of illustration and not limitation.

BRIEF DESCRIPTION OF THE DRAWINGS

FIG. 1 is a perspective view of the transfer apparatus of the invention;

FIG. 2 is a view of a portion of the push-out assembly taken along the lines 2—2 of FIG. 1;

DESCRIPTION OF THE PREFERRED EMBODIMENT

Figure 4:
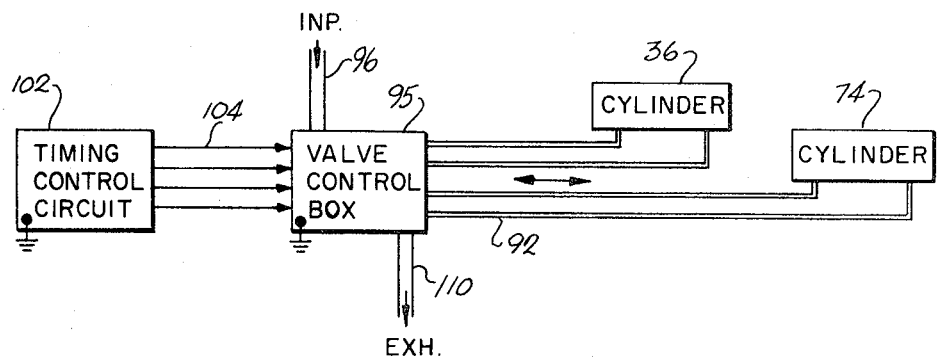
FIG. 4 is a circuit diagram for controlling the double action drive cylinders of FIG. 1.

It is helpful to appreciate the manufacturing environment to which the apparatus of the present invention is adapted. A typical glass forming machine with which the invention is particularly suited is known as an individual section or I.S. machine. An example of such a machine is shown and described in U.S. Pat. No. 1,911,119, issued May 23, 1933. In glass manufacturing, it is common that a number of such machines are lined up side by side to function as an integral unit with a conveyor system, as well as with a feeder, to transfer glass gobs from a furnace. Usually, a corresponding number of deadplates and associated transfer devices are provided to permit cooling newly formed containers for a short interval followed by transfer to the conveyor system.

Accordingly, it is anticipated that a plurality of such devices, as hereafter described with reference to the apparatus of the present invention, may be utilized to transfer the containers from respective deadplates to the conveyor in a glass container manufacturing facility.

As shown in FIG. 1, a timeable transfer system 10 of the invention includes a frame having a base 11 extending adjacent to and above a deadplate 12 having perforations 14 which permit air to be forced from beneath the deadplate and about newly formed glass jars 16. The jars 16 may be considered as having been previously transferred to the position of FIG. 1 by means such as conventional tongs (not shown) of the glass forming machine which tongs grip the necks of the jars at the molds for transfer to the deadplate 12. A push-across assembly 15 moves the jars 16 in a direction along the line 18 defined by the arrows and substantially parallel to the direction of movement of a conveyor belt 19 alongside the deadplate 12.

A guide rod 20 extends between vertically disposed wall portions 21 of the base housing 11 to mount an L-shaped carriage block 24 having a hole extending through the base thereof to receive rod 20 in slip-fit relation. A bar 26 is secured to the carriage block 24 and extends over the deadplate 12. The bar is provided with slots 28 through which bolts 29 may be inserted to secure and laterally adjust a plate 30. The plate 30 is partially shaped, at the ware-contacting portion, to the contour of the jars 16 at recesses 31, and as shown, is adapted to engage and space two glass jars. One recess 31 in the plate 30 is deeper than the other so that upon movement across the deadplate 12, one jar 16 is spaced behind the other in the direction of the initial push-across movement.

The L-shaped carriage block 24 has a shoulder through which the pin of a clevis 32 may be inserted. The clevis 32 is screwed to one end of a piston rod 34 extending from a fluid cylinder 36. The cylinder 36 is pivotably mounted opposite the rod end on a pin 38 extending between vertically disposed sides of the base 11. Cylinder 36 is a double action type cylinder having ports at both ends which are alternately connected to the input and exhaust of the fluid system hereinafter schematically illustrated and described with reference to FIG. 4.

A push-out assembly 35 is provided to position the glass jars 16 onto the moving conveyor belt 19 after the initial movement of the jars by the push-across assembly 15, already described. The push-out assembly is supported by the frame within a jacket 40 secured, as by welding, to a plate 42 which is fixedly mounted upon the base 11. A protective cover 44 is adapted to fit on jacket 40 and is shown partially cutaway along with the jacket in order to show the enclosed elements.

The assembly includes a crank 46 pivotably mounted by a pin 48 extending into radial bearings 49 received in opposite walls of the jacket 40. The crank includes an integral cantilevered shoulder 50, as better shown in FIG. 2, having holes 49 and 51, and a slot 53. Hollow rod 52 is clamped within hole 49 by a bolt 55 received through hole 51. Tightening the bolt tends to close the adjacent surfaces defining slot 53 thereby restraining rod 52 in a fixed position. The position of rod 52, however, may be readily changed to adjust the length of the total moment arm extending from pivot pin 48 downwardly toward deadplate 12.

A flanged bolt 56 extends through the hollow rod 52 and is screw threadedly engaged within a pair of clamps 58 and 60 between which is held a U-shaped bar 62. The bar 62 is provided with bumpers 64 which contact the jars 16 to slide them onto conveyor belt 19. The bumpers 64 are preferably an asbestos material which withstand the high glass surface temperatures and which will not damage the jars upon contact.

Figure 3:
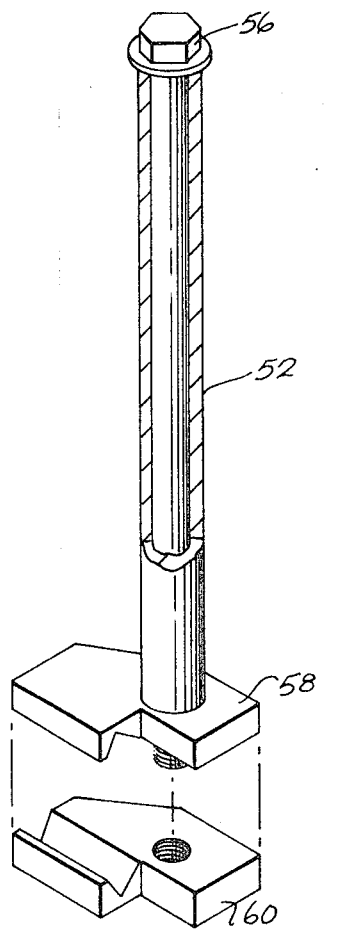
FIG. 3 is a perspective view of partly disassembled arm elements of the push-out assembly of FIG. 1.

FIG. 3 shows a perspective view of the rod 52 removed from the shoulder 50 of crank 46. Clamps 58 and 60 are disassembled but in alignment with each other at a position to receive the threaded end of the bolt 56 in order to secure bar 62.

The crank also has a vertically disposed slot 66, and a hole for receiving the neck of a clevis 68. Another hole, perpendicular to the surfaces defining slot 66, receives a bolt 69, tightening of which restrains the clevis 68 to the swing 46. A link 70 is fixedly mounted on a piston rod 72 of a fluid cylinder 74. The cylinder 74 is pivotably mounted, opposite the rod end, on a pin 76 extending between vertically disposed walls at the bottom portion of jacket 40. Cylinder 74 is also of the double action type and is similar to the cylinder 36.

Each of the double action cylinders 36 and 74 are supplied with fluid through oppositely disposed ports connected to flexible conduits 82, 84, and 86, 88, respectively. The conduits are connected through an interface block 90 to permanent pipes 92. The pipes 92 lead to a valve control box 95 of conventional type provided to distribute fluid, passed from an input conduit 96, to the cylinders 36 and 74, and from the cylinders to an exhaust conduit 100.

In FIG. 4, arrows are shown in pipes 92 between valve control box 95 and cylinders 36 and 74 to illustrate that the direction of flow in each pipe alternates. For instance, to effect a stroke in one direction of piston rod 34 of cylinder 36, fluid flows into one port and out the other, while to effect the stroke in the opposite direction fluid flows into the other port and out of the one port.

In order to distribute fluid to actuate the cylinders 36 and 74 in proper sequence, an electrical timing control circuit 102, as shown in FIG. 4, is provided. The timing control circuit 102 may be of a type such as shown and described in U.S. Pat. No. 3,365,623, issued Jan. 23, 1968, to David S. Stacey and assigned to the assignee of the present invention. The control circuit 102 is connected by conductors 104 to solenoid-actuated valves of the valve control box 95. It may be readily appreciated that other timing control means well known to those skilled in the art may be utilized to actuate valves in order to control fluid flow to the cylinders 36 and 74. As a more specific example, mechanical means such as cams positioned at predetermined distances about a rotating drum may be utilized to engage spring biased valves so as to open and close the same in order to control fluid flow.

In brief, the operation of the apparatus shown is as follows:

Sequential timing signals, each of predetermined duration, are conducted to solenoids associated with valves on conductors 104 to operate the valves. Each valve is actuated by its associated solenoide (not shown) to an open position upon response to the electrical signal, for a time duration sufficient to permit a complete unidirectional stroke of the piston rod of the cylinder fluidly connected to the respective valve. The time required for a complete stroke is a function of controlled parameters, which may readily be varied, and which include fluid pressure and type, cylinder size, valve response time, and the like. After a complete stroke of the piston rod in one cylinder, a timing signal on another conductor energizes a second solenoid associated with an appropriate valve to reverse the fluid flow to the particular cylinder causing a stroke of the piston rod in the opposite direction. Two subsequent timing signals then control appropriate valves in the same manner so that the piston rod of the other cylinder is driven in a complete reciprocation cycle.

Thus, upon fluid being forced through conduit 82 to the associated port of cylinder 36 after jars 16 are positioned adjacent the recesses of plate 30, the rod 34 is forced into the cylinder which draws carriage block 24 along guide rod 20. The plate 30 engages the jars 16 and slides them to a position on deadplate 12 adjacent bar 62. Fluid is then forced through conduit 84 to the associated port of cylinder 36 to force the rod back out of the cylinder and to return carriage block 24 and plate 30, carried by the carriage block, to the position shown in FIG. 1. During the return of plate 30, or thereafter, fluid is forced into the upper port of the cylinder 74 which draws rod 72 into the cylinder causing crank 46 to pivot about pin 48 whereby bar 62 swings across the deadplate 12. Bumpers 64 at the base of the U-shaped bar 62 contact the jars which are slid across the deadplate and onto the conveyor belt 19. Fluid is then forced into the lower port of the cylinder 74 forcing the rod 72 back out of the cylinder so as to cause crank 46 to pivot back to the position of FIG. 1. The next pair of jars, being deposited on deadplate 12 adjacent plate 30 during the operation of the push-out assembly, is then slid across the deadplate 12 by the push-across assembly as already described, and so on as the operation is repeated.

The time between activation of the cylinders 36 and 74 may be regulated by the timing control circuit 102 and depends upon the duration between the last timing signal to actuate a valve fluidly connected to one cylinder, and the first timing signal to actuate a valve fluidly connected to the other cylinder. Further, the time required for a single stroke of a piston rod of one cylinder may be different from that of the other cylinder; therefore, the duration of timing signals to actuate valves fluidly connected to one cylinder may vary from the duration of the timing signals to actuate valves fluidly connected to the other cylinder of the pair of cylinders, 36 and 74. In utilizing the electrical timing control circuit, it is readily apparent that the push-across and push-out assemblies contacting the ware, although fluid driven, may be electrically controlled to operate for predetermined periods, in predetermined sequence, and with appropriate delays between sequential periods of operation of the assemblies with respect to each other.

Further, and as already described a plurality of transfer apparatus may be used as integral units of a corresponding number of I.S. machines. The timing control circuit 102 may be utilized so as to adjustably control the activation of the push-out assembly 35 relative to other push-out assembleis so as to avoid sliding containers onto the common conveyor at a time when glassware from another machine is positioned, in its course of travel, immediately in front of push-out assembly 35.

Although only one embodiment of the invention has been shown and described, various embodiments as may appear to those skilled in the art are intended to be within the contemplation of the invention as defined in scope by the claims.

What is claimed is:

1. Apparatus for transferring articles on a support, the apparatus comprising: first transfer means adjacent the support to positionally shift the articles in one direction; first fluid drive means for actuating said first transfer means; pivot means above the support; second transfer means depending from said pivot means so that a portion of said second transfer means pivots adjacent the support to positionally shift the articles in another direction; second fluid drive means connected to said second transfer means for pivoting said second transfer means; and means for controlling fluid flow to said drive means to effect predetermined sequential movement of said transfer means in said first and second directions, respectively.

2. Apparatus for automatically transferring articles on a support, the apparatus comprising: a frame adjacent the support; first transfer means adjacent the support to push the articles in one direction; first fluid drive means for reciprocating said first transfer means, said first drive means being mounted to said frame; second transfer means adjacent the support to push the articles in another direction, said second transfer means having an upper portion pivotably mounted to said frame above the support and a lower portion depending from said upper portion and engageable with articles on the support; second fluid drive means connected to said second transfer means for pivoting said second transfer means so that said lower portion pivots through a predetermined arc in said another direction, said second drive means being mounted to said frame; and valve means for controlling fluid flow to said fluid drive means so that the articles may be pushed in the one direction by said first transfer means and thereafter pushed in the other direction by said second transfer means.

3. Apparatus for transferring glassware from a plate to an adjacent conveyor, the apparatus comprising: a frame; means connected to the frame for moving the glassware in one direction across the plate, said means including glass engaging means above the plate and fluid drive means attached to the engaging means; other means connected to said frame for moving the glassware in another direction, above the plate and onto the conveyor, said other means including rigid crank means to engage the glassware at one end and pivotably mounted above said frame at a position spaced from the one end, and other fluid drive means attached to the crank means at another position spaced from the last-mentioned position; and means for controlling fluid flow to both fluid drive means, said fluid flow control means including conduits, valve means to regulate fluid flow in the conduits, and timing means to actuate the valve means; whereby the glass engaging means may move above the plate and the crank means subsequently pivoted to move the glassware to the conveyor with precise time and duration control of the movements of said engaging means and crank means.

4. The combination as defined in claim 3 wherein the fluid drive means of each of said moving means includes a double action cylinder having a piston, and a piston rod, the rod of one cylinder being pivotably connected to the glass engaging means and the rod of the other cylinder being pivotably connected to the crank means.

5. The combination as defined in claim 4 further including the rod of the one cylinder being connected to the glass engaging means by a clevis, the rod of the other cylinder being connected to the crank means by another clevis; and said cylinders each being pivotably mounted to said frame, whereby the rods of both cylinders may both move with two degrees of freedom as permitted by rod movement relative to respective cylinders and respective cylinder movement relative to said frame.

6. Apparatus for moving glass containers from a deadplate to a conveyor, the apparatus comprising: support means; reciprocating means for pushing the containers in one direction across the deadplate; other means for pushing the containers in another direction and to the conveyor, said other pushing means including rigid crank means to engage the articles at one end and pivotably mounted above said support means at a position spaced from the one end; and drive means for sequentially actuating said reciprocating and other pushing means.

7. Apparatus for moving articles from a support to a conveyor, the apparatus comprising: a frame, first means for transferring the articles in one direction across the support; said first means including male and female guide means, one of said male and female guide means being stationary and connected with said frame and the other of said male and female guide means being movable so as to engage the articles; second means for transferring the articles in another direction and to the conveyor, said second means including rigid crank means to engage the articles at one end thereof and pivotably mounted above said frame at a position spaced from the one end; and drive means for sequentially actuating said first and second transfer means.

References Cited

UNITED STATES PATENTS

| | | | |
|---|---|---|---|
| 2,556,469 | 6/1951 | Dahms | 198—24 |
| 2,768,756 | 10/1956 | Horman | 198—24 |

RICHARD E. AEGERTER, Primary Examiner

U.S. Cl. X.R.

65—348, 351; 198—24